J. P. APPLEBY.
ANIMAL TRAP.
APPLICATION FILED MAY 9, 1913.
1,184,667.
Patented May 23, 1916.
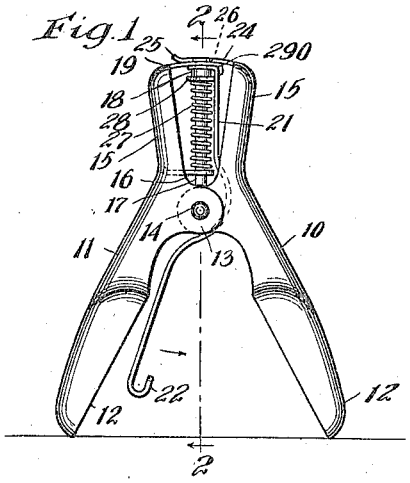
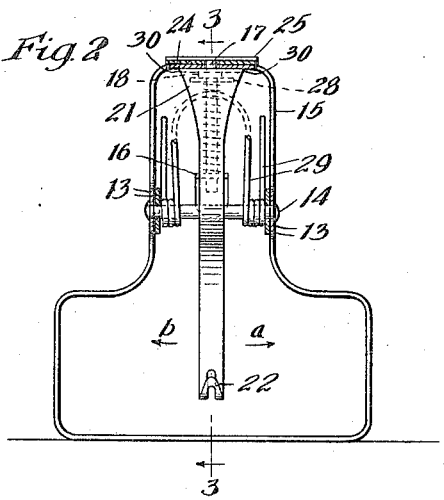
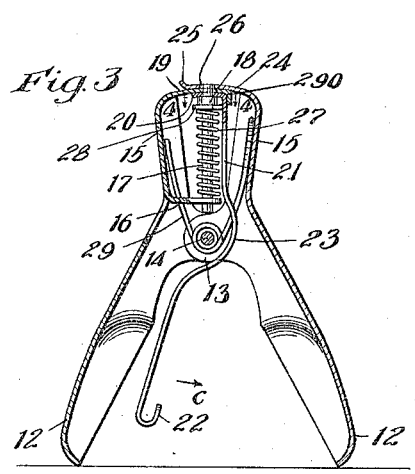
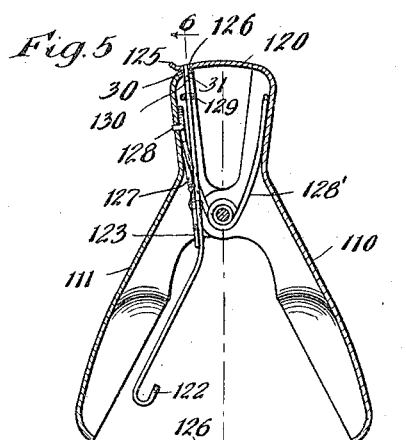
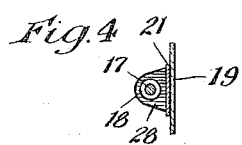
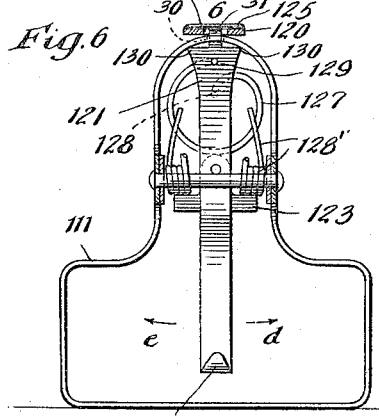
Witnesses:
Wm. Geiger
Esther Abrams
Inventor:
James P. Appleby
By Munday, Evarts, Adcock & Clarke,
Attys

UNITED STATES PATENT OFFICE.

JAMES P. APPLEBY, OF OTTUMWA, IOWA, ASSIGNOR TO JOHNSTON & SHARP MFG. CO., OF OTTUMWA, IOWA, A CORPORATION OF IOWA.

ANIMAL-TRAP.

1,184,667.          Specification of Letters Patent.          Patented May 23, 1916.

Application filed May 9, 1913. Serial No. 766,535.

*To all whom it may concern:*

Be it known that I, JAMES P. APPLEBY, a citizen of the United States, residing in Ottumwa, in the county of Wapello and State of Iowa, have invented a new and useful Improvement in Animal-Traps, of which the following is a specification.

This invention relates to improvements in animal traps.

An object of the invention is to provide an animal trap more particularly designed for catching mice, which is cheap to manufacture, is easily set by merely pressing parts thereof together, which is provided with a releasing or trip lever so arranged that it is adapted to swing in a plurality of different directions from its normal position when the trap is set, and in which the parts forming the jaws and handle portions may be formed from stamped sheet metal.

The invention furthermore consists in the improvements in the parts and devices and in the novel combinations of the parts and devices as herein shown, described or claimed.

In the drawing forming a part of this specification Figure 1, is a side elevation of one form of trap embodying my improvements, the trap being shown set; Fig. 2 is a vertical section taken substantially on the line of 2—2 Fig. 1; Fig. 3 is a vertical section taken substantially at right angles to the section shown in Fig. 2 and on the line 3—3 thereof; Fig. 4 is a detailed sectional view taken on the line 4—4 of Fig. 3; Fig. 5 is a vertical sectional view showing another form of trap embodying my improvements; and Fig. 6 is a section of the trap shown in Fig. 5 and taken on the line 5—5 thereof.

In said drawing, the trap shown in Figs. 1 to 4, inclusive, comprises a pair of members 10 and 11, each preferably formed of stamped sheet metal and each having at its lower end a rectangular portion 12 forming a jaw. Each of the members 10 and 11 is also provided with a pair of ears 13 at a point above the jaws, by which the members are pivotally connected as by pivot pin 14, the latter being preferably upset at its ends in order to hold the parts together. Above the ears 13, the members 10 and 11 are provided with handle portions 15, the handle portion 15 of the member 11 being provided with an in-turned integral lug 16 provided with a slot in which is slidably mounted a plunger latch 17, said plunger 17 having a collar 18 fixed thereon near its upper end and projecting through another slot in an inwardly extended projection 19 formed on the upper end of the member 11. Loosely mounted on the plunger 17 and between the collar 18 and member 19 is a rectangular flange 20 formed integral with, and extending at right angles to, a trip lever 21, the latter extending down past the pivot pin 14 and having a bait-holding hook 22 at its lower end, the trip lever 21 being offset, as shown at 23, to freely pass by the pivot pin 14. The upper end of the handle portion 15 of the member 10 is also provided with an inwardly projecting extension 24, having a slightly up-turned lip 25, the extension 24 being adapted to slide over the member 19 when the handle portions 15 are pressed together, said extension 20 having a perforation 26 therein adapted to aline with and receive the plunger latch 17, which is normally urged upward by means of a coiled spring 27 encircling the plunger latch 17 and mounted between the lug 16 and a spring washer 28 mounted on the plunger below the collar 18. The jaw portions 12 are normally urged together by means of a spring 29 suitably mounted on the pivot pin 14 and having portions thereof for pressing the handle portions 15 outwardly.

From the foregoing description it will be seen that the latch 17 will engage in the perforation 26 in the extension 20 when the handle portions are pressed together, thereby setting the trap and holding the jaws open against the action of the spring 29. When the animal nibbles or bites the bait on the hook 22 the trip lever 21 will oscillate about either the edge 290 (see Fig. 3) or the edges 30 (see Fig. 2) which will cause the flange 20 to be depressed, thereby pressing with it the plunger latch 17 and releasing the members 10 and 11 and allowing the jaws to snap together. It will be noted that the trip lever 21 is adapted to swing from its normal position in a plurality of different directions, as indicated by arrows *a* and *b* in Fig. 2 and by the arrow *c* in Fig. 3, thereby making the releasing mechanism particularly sensitive and consequently very effective.

Referring now to the structure shown in Figs. 5 and 6 it will be seen that the members 110 and 111 which form the jaw and handle portions are similarly pivoted as are the members 10 and 11 of the structure illustrated in Figs. 1 to 4, said members 110 and 111 being controlled by a spring 128'. The member 111 is provided with a slot 30 at its upper end, through which is loosely slidable a projection 31 formed on the upper end of a trip lever 121, the latter having oppositely disposed shoulders 130 which are normally in engagement with the underside of the top of the member 111, being held in such position by means of a wire spring 127, one end, 128, of which projects through and is held by the member 111 (see Fig. 5), and the other end of which projects through the trip lever 121 as at 129. The trip lever 121 is provided with a bait-holding hook 122 and intermediate its ends has secured thereto a plate 123 adapted to engage the sides of the members 111 and limit the amount of swinging movement of the trip lever 121. The projection 31 is of such length that it will catch in a slot 126 formed in an extension 120 integral with the member 110, the extension 120 having an up-turned lip 125 to facilitate the flange 120 passing over the projection 31.

From the foregoing description, it will be seen that the trap is set by merely pressing the handle portions of the members 110 and 111 together, whereupon the projection or latch 31 will engage in the slot 126 and hold the jaws open against the action of the spring 128, and that by oscillating the trip lever 121 in either of the directions indicated by the arrows $d$ and $e$ (Fig. 6), the lever 121 will swing about either of the shoulders 130, thereby retracting the projection or latch 31 against the action of the spring 127, releasing the latch and allowing the jaws to snap together.

Although I have herein shown and described what I now consider the preferred embodiment of my invention, yet it will be understood that various changes and modifications may be made in the details of construction and arrangement of parts without departing from the spirit of the invention, and all such changes and modifications are contemplated as come within the scope of the claims appended hereto.

I claim:

1. An animal trap of the character described including, in combination: two members pivotally connected together, each member having a jaw portion and a handle portion; a spring for normally holding the jaw portions in engagement with each other; a plunger latch slidably mounted on the handle portion of one of said members; a spring normally urging said plunger latch outwardly; and a trip lever loosely mounted on said plunger latch and adapted to oscillate in a plurality of directions angularly disposed with respect to each other from its normal position when the latch is set, to thereby release the latch, substantially as specified.

2. An animal trap comprising in combination, a pair of pivotally connected members, each having a jaw portion on one side of the pivotal connection and having overlapping parts provided with apertures positioned to register when the trap is set, a spring-pressed latch adapted to extend through said apertures, and a trip lever for releasing said latch, said trip lever being movable in a direction through the jaws or in a direction across the jaws to produce operation of the trap.

JAMES P. APPLEBY.

Witnesses:
Sam Redman,
B. Harper.

Copies of this patent may be obtained for five cents each, by addressing the "Commissioner of Patents, Washington, D. C."